US008891347B2

(12) United States Patent
Yin

(10) Patent No.: US 8,891,347 B2
(45) Date of Patent: Nov. 18, 2014

(54) USER-FOCUSING TECHNIQUE FOR WIRELESS COMMUNICATION SYSTEMS

(75) Inventor: Xuefeng Yin, Shanghai (CN)

(73) Assignee: Empire Technology Development LLC, Wilmington, DE (US)

( * ) Notice: Subject to any disclaimer, the term of this patent is extended or adjusted under 35 U.S.C. 154(b) by 178 days.

(21) Appl. No.: 13/522,422

(22) PCT Filed: Jul. 28, 2011

(86) PCT No.: PCT/CN2011/077718
§ 371 (c)(1),
(2), (4) Date: Jul. 16, 2012

(87) PCT Pub. No.: WO2013/013407
PCT Pub. Date: Jan. 31, 2013

(65) Prior Publication Data
US 2013/0107733 A1    May 2, 2013

(51) Int. Cl.
*H04J 11/00* (2006.01)
*H04W 4/00* (2009.01)
*H04B 1/04* (2006.01)
*H04L 5/00* (2006.01)
*H04W 24/02* (2009.01)
*H04L 1/00* (2006.01)
*H04L 27/01* (2006.01)
*H04L 1/12* (2006.01)

(52) U.S. Cl.
CPC .............. *H04L 5/0001* (2013.01); *H04W 24/02* (2013.01); *H04L 1/0026* (2013.01); *H04L 27/01* (2013.01); *H04L 5/0014* (2013.01); *H04L 1/12* (2013.01); *H04L 5/0003* (2013.01); *Y02B 60/50* (2013.01)
USPC ..... 370/203; 370/338; 455/114.3; 455/114.2; 455/63.1

(58) Field of Classification Search
CPC ... H04L 5/0001; H04L 5/0003; H04L 5/0014; H04L 5/0026; H04L 5/0028; H04L 5/0021; H04L 5/0016
USPC ............ 455/114.3, 114.2, 63.1; 370/203, 338
See application file for complete search history.

(56) References Cited

U.S. PATENT DOCUMENTS

| 2007/0177551 A1* | 8/2007 | Joham et al. ................... 370/332 |
| 2010/0177746 A1* | 7/2010 | Gorokhov et al. ............ 370/336 |
| 2011/0103457 A1 | 5/2011 | Phan Huy et al. |

FOREIGN PATENT DOCUMENTS

| CN | 102138309 A | 7/2011 |
| WO | 2011/012031 A1 | 2/2011 |

OTHER PUBLICATIONS

International Search Report dated May 3, 2012 as received in application No. PCT/CN2011/077718.

(Continued)

*Primary Examiner* — Kwang B Yao
*Assistant Examiner* — Adam Duda
(74) *Attorney, Agent, or Firm* — Maschoff Brennan

(57) ABSTRACT

Systems and methods for wireless communication in a system including a transmitter, a receiver, and a plurality of propagation paths formed between the transmitter and the receiver which are capable of carrying a signal transmitted by the transmitter to the receiver. The method includes transmitting a first signal from the transmitter to the receiver via a propagation path of the plurality of propagation paths, receiving the first signal at the receiver, performing a channel estimation of the first signal to obtain path parameter information of the propagation path, sending the channel estimation from the receiver to the transmitter via the propagation path, pre-distorting a second signal at the transmitter according to the channel estimation, transmitting the predistorted signal from the transmitter to the receiver via the propagation path, and receiving the predistorted signal at the receiver.

25 Claims, 4 Drawing Sheets

(56) References Cited

OTHER PUBLICATIONS

Written Opinion of the International Searching Authority dated May 3, 2012 as received in application No. PCT/CN2011/077718.
"3rd Generation Partnership Project; Technical Specification Group Radio Access Network; Further Advancements for E-UTRA Physical Layer Aspects (Release 9)", 3GPP TR36.814, V0.4.1(Feb. 2009), pp. 1-31.
Sampath et al., "Pre-Equalization for MIMO Wireless Channels with Delay Spread", 52nd Vehicular Technology Conference, IEEE VTS-Fall VTC 2000, vol. 3, pp. 1175-1178.
Holfeld et al., "Order-Recursive Precoding for Cooperative Multi-Point Transmission", Proceedings of the International ITG/IEEE Workshop on Smart Antennas (WSA 2010), 2010, pp. 39-45.
Saleeb, "Design of a smart antenna for reducing co-channel interference in cellular mobile communications", Antennas and Propagation Society International Symposium, IEEE, 1999, vol. 3, pp. 1620-1623.
Fleury et al., "Channel Parameter Estimation in Mobile Radio Environments Using the SAGE Algorithm", IEEE Journal on Selected Areas in Communications, 1999, vol. 17, Issue 3, pp. 434-450.
Odhah et al., "Frequency domain pre-equalization for MIMO broadband CDMA communication systems", National Radio Science Conference, 2009( NRSC 2009), Mar. 17-19, 2009, pp. 1-8.
Ning et al., "Joint Processing Precoding for Coordinated Multi-Point Transmission in LTE-A", ZTE Communications, Feb. 2010, vol. 16, No. 1, pp. 37-39, <http://wwwen.zte.com.cn/endata/magazine/ztecommunications/2010Year/no1/articles/201003/t20100321_181531.html>.

* cited by examiner

US 8,891,347 B2

USER-FOCUSING TECHNIQUE FOR WIRELESS COMMUNICATION SYSTEMS

BACKGROUND

Wireless communication systems confront more and more challenges. One such challenge exists in hot-spots where highly concentrated groups of mobile users create large demands of system capacity. Other challenges exist where co-located heterogeneous networks in certain areas create interference and difficulties in inter-network handover. In order to address these and other problems, various techniques have been developed, such as relay techniques and coordinated multi-point (CoMP) transmission. Both the relay and the CoMP techniques are used to increase the number of parallel channels between the source of a signal and the destination. While these techniques increase system performance, they also require careful network planning and require high computation resources. In some instances, the techniques operate by exploiting additional resources from propagation channels.

Other techniques, such as equalization techniques achieve the same purposes without changing current system configurations. Equalization techniques are used in the receivers of the system in order to recover the original transmitted signal by removing any distortions that arise in the transmittal. When the impact of a channel is perfectly equalized, the signals arriving at the receiver from the different paths are then "aligned" in phases and can be added constructively. Typical examples of equalization techniques include the following: (1) RAKE receiving technique, which equalizes the channel in the delay domain; (2) the frequency equalization technique which has been widely adopted in the receivers based on OFDM transmission; and (3) the time-frequency equalization technique used in the receivers of 4G systems, such as the TD-Long-Term-Evolution (LTE) wireless communication systems.

One problem with these techniques, however is that they require that channel equalization be performed at the receiver, meaning that the receiver have additional resources in order to perform the equalization.

SUMMARY

In one embodiment, a method is provided for conducting wireless communications in a communications system. Such a communications system can include a transmitter, a receiver, and a plurality of propagation paths formed between the transmitter and the receiver. The propagation paths can be configured to be capable of carrying a signal transmitted by the transmitter to the receiver. The method can include: transmitting a first signal from the transmitter to the receiver via a propagation path of the plurality of propagation paths; receiving the first signal at the receiver; performing a channel estimation of the first signal to obtain path parameter information of the propagation path; sending the path parameter information from the receiver to the transmitter via the propagation path; predistorting a second signal at the transmitter according to the path parameter information; transmitting the predistorted signal from the transmitter to the receiver via the propagation path; and receiving the predistorted signal at the receiver.

In one embodiment, a communications system can be provided for conducting wireless communications. The system can include a receiver, a transmitter and a plurality of propagation paths formed between the transmitter and the receiver which are capable of carrying a signal transmitted by the transmitter to the receiver. The receiver can be configured to receive a first signal from the transmitter, perform a channel estimation of the first signal to obtain path parameter information of the propagation path, and send the path parameter information of the path to the transmitter via the propagation path. The transmitter can be configured to predistort a second signal according to the channel estimation received from the receiver, and transmit the predistorted signal to the receiver via the propagation path.

In one embodiment, a base station can be provided for performing wireless communications with a receiver in a wireless device via a plurality of propagation paths. The base station can include at least one transmitter; a computing device; and a computer-readable storage medium having computer-executable instructions stored thereon that are executable by the computing device to perform operations. The computing device operations can include: transmitting a first signal from the transmitter to the receiver via a propagation path of the plurality of propagation paths; receiving a channel estimation of the first signal including path parameter information of the propagation path; predistorting a second signal according to the channel estimation; and transmitting the predistorted signal from the transmitter to the receiver via the propagation path.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and following information as well as other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
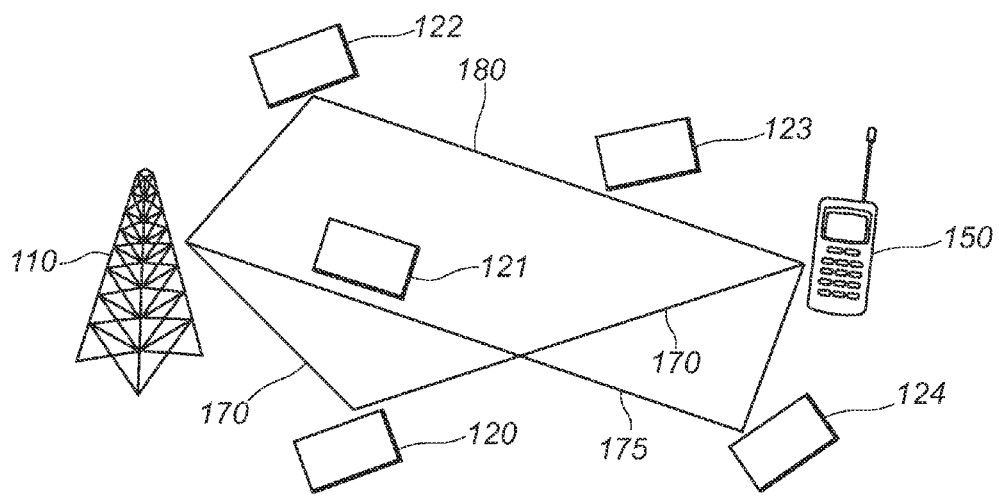
FIG. 1 includes a schematic representation of an embodiment of a wireless communication system which is capable of performing a user-focusing technique as described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1 includes a schematic representation of an embodiment of a wireless communication system which is capable of performing a user-focusing technique as described herein. FIG. 1 illustrates a single-link communication scenario between a base station which is configured so as to act as a transmitter 110 and a mobile station which is configured so as to act as a receiver 150. Between the transmitter 110 and the receiver 150 are a number of buildings 120-124, which act as scatterers and bouncing points of communication signals traveling between the transmitter 110 and the receiver 150 via propagation paths 170, 175, and 180.

Simply speaking, the methods and systems described herein use the propagation paths 170, 175, and 180 as multiple parallel carriers of the communication signals. In most communications currently used in the art, these various propagation paths 170, 175, and 180 are usually considered to be problematic rather than being considered as a resource-bank.

Using the method and systems described herein, however, the wireless connection between the transmitter 110 and the receiver 150 becomes analogous with multiple wired connections linking the two points. Using this configuration, many existing problems, e.g. the interference cancellation, capacity limitations, may be removed. The system and methods described herein are referred to as "user-focusing" and make use of multiple propagation paths 170, 175, and 180 between the transmitter 110 and receiver 150 as the parallel carriers. These paths are different in delay, direction of arrival, direction of departure and Doppler frequency. Along these paths, an electromagnetic wave may arrive at the receiver with different phases. However, in the user-focusing method and system described herein, the transmitted signal modulates the parallel carriers in such a way that the wave arriving at the receiver 150 from different paths 170, 175, and 180 have the same phase, and may be superimposed coherently.

The effect when using this user-focusing technique is that the system can send the signals directly to the location of the receiver 150, i.e. create a "focus" of the signal at the receiver 150. As may be understood by one of ordinary skill in the art, this system has various benefits, including but not limited to: 1) the total transmit power may decrease because the transmitter 110 wastes no energy on sending the signals to the regions where no paths exist; 2) the interference among users can be significantly reduced and consequently, the quality of service can be improved; 3) the currently used multi-point cooperative technologies might be unnecessary, as the methods and systems described herein provides acceptable performance using just one transmitter 110.

Figure 2:
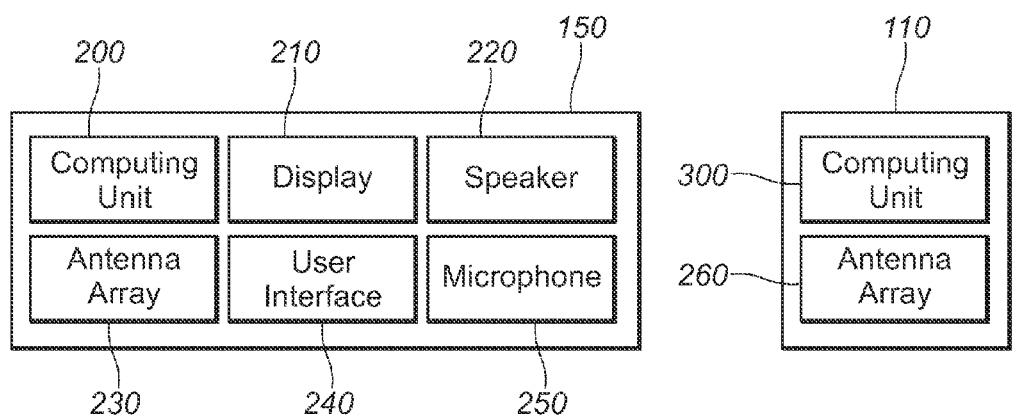
FIG. 2 includes a block diagram illustrating an embodiment of a transmitter and a receiver which may be used in performing a user-focusing technique as described herein.

FIG. 2 illustrates two block diagram illustrating exemplary components of the transmitter 110 and the receiver 150 although the transmitter 110 and receiver 150 may include other components or omit any non-essential components without varying from the scope and meaning of the claims recited below. In this example, the receiver comprises a mobile station which includes a computing unit 200 which is capable of controlling the function of the other modules 200-250 of the mobile station, a display 210 capable of displaying one or more images on the mobile station, a speaker 220 including an electroacoustic transducer that produces sound in response to an electrical audio signal input, an antenna array 230 including one or more antennas which are used to send and receive signals with the transmitter 110, a user interface 240 which enables a user of the mobile station to manipulate and interact with the processes of the computing unit 200 so as to control the various modules 200-250 of the mobile station, and a microphone 250 configured to capture an acoustic sound and convert it into an electronic signal using an acoustic-to-electric transducer or sensor.

The transmitter 110, which includes a base station in this example, includes a computing unit 300 described more fully below and an antenna array 260 comprising one or more antenna which are used to send and receive signals with the receiver 150.

Figure 3:
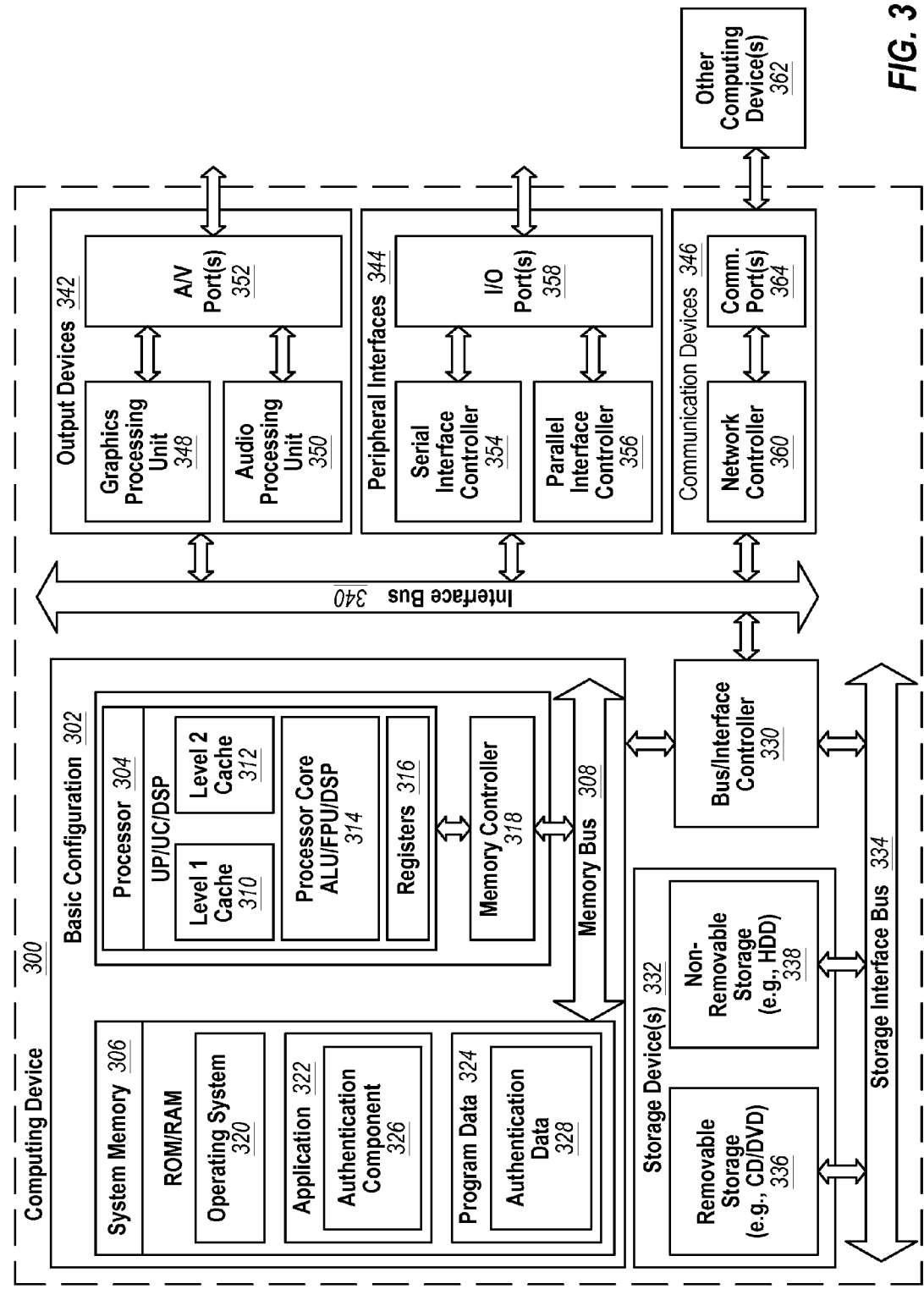
FIG. 3 includes a diagram representing an embodiment of a computing unit of a transmitter used in performing a user-focusing technique as described herein.

FIG. 3 depicts a block diagram illustrating an example computing device 300 of the transmitter 110 or receiver 150 that is arranged to implement the user-focusing technique for wireless communication described more fully below. In a very basic configuration 302, the computing device 300 typically includes one or more processors 304 and a system memory 306. A memory bus 308 may be used for communicating between processor 304 and system memory 306.

Depending on the desired configuration, processor 304 may be of any type including but not limited to a microprocessor (µP), a microcontroller (µC), a digital signal processor (DSP), or any combination thereof. Processor 304 may include one or more levels of caching, such as a level one cache 310 and a level two cache 312, a processor core 314, and registers 316. An example processor core 314 may include an arithmetic logic unit (ALU), a floating point unit (FPU), a digital signal processing core (DSP Core), or any combination thereof. An example memory controller 318 may also be used with processor 304, or in some implementations memory controller 318 may be an internal part of processor 304.

Depending on the desired configuration, system memory 306 may be of any type including but not limited to volatile memory (such as RAM), non-volatile memory (such as ROM, flash memory, etc.) or any combination thereof. System memory 306 may include an operating system 320, one or more applications 322, and program data 324. Application 322 may include an authentication component or application 326 that is arranged or configured to construct an authentication system or authenticate one or more devices or users. Program data 324 may include authentication data 328 for constructing an authentication system and/or authenticating one or more devices or users. In some embodiments, application 322 may be arranged to operate with program data 324 on operating system 320 such that an authentication system is generated. This described basic configuration 302 is illustrated in FIG. 3 by those components within the inner dashed line.

Computing unit 300 may have additional features or functionality, and additional interfaces to facilitate communications between basic configuration 302 and any required devices and interfaces. For example, a bus/interface controller 330 may be used to facilitate communications between basic configuration 302 and one or more data storage devices 332 via a storage interface bus 334. Data storage devices 332 may be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 306, removable storage devices 336 and non-removable storage devices 338 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 300. Any such computer storage media may be part of computing device 300.

Computing device 300 may also include an interface bus 340 for facilitating communication from various interface devices (e.g., output devices 342, peripheral interfaces 344, and communication devices 346) to basic configuration 302 via bus/interface controller 330. Example output devices 342 include a graphics processing unit 348 and an audio processing unit 350, which may be configured to communicate to various external devices such as a display or speakers via one or more A/V ports 352. Example peripheral interfaces 344 include a serial interface controller 354 or a parallel interface controller 356, which may be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which may be arranged to facilitate communications with one or more other computing devices 362 over a network communication link via one or more communication ports 364.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

In addition to being a component of the transmitter 110 base station, the computing unit 300 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. As such, the computing unit 200 of the receiver 150 configured as a mobile station may include the same or similar components as the computing device 300. Additionally, the computing device 300 may also be implemented as a personal computer including both laptop computer and non-laptop computer configurations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Returning to FIG. 1, as understood by one of ordinary skill in the art, the impulse response of the propagation channel can be viewed as the superposition of multiple specular propagation paths 170, 175, and 180 between a transmitter 110 and a receiver 150.

As previously described with reference to FIG. 1, there are multiple propagation paths 170, 175, and 180 between the transmitter 110 and the receiver 150 wherein the signal, comprising an electromagnetic wave may bounce off the various buildings or bouncing points 120-124. The interactions between the electromagnetic wave and the bouncing points 120-124 can be reflection, diffraction or scattering. The signals radiated from the transmitter 110 experience different distortions along these propagation paths 170, 175, and 180. The resulting multiple replica of the original transmitted signals are added at the receiver 150, either destructively or constructively.

Typically, equalization techniques known in the art are used in the receivers 150 to recover the original transmitted signal by removing the distortions. After the impact of channel is perfectly equalized, the signals arriving at the receiver 150 from different propagation paths 170, 175, and 180 are "aligned" in phases and added constructively.

Typical examples of equalization techniques include: 1) the RAKE receiving technique, which equalizes the channel in the delay domain; 2) the frequency equalization technique, widely adopted in the receivers based on OFDM transmission; and 3) the time-frequency equalization technique used in the receivers of 4G systems, such as the TD-LTE (Long-Term-Evolution) wireless communication systems.

As described more fully below with reference to FIG. 4, unlike the equalization technique which corrects the distortion at the receiver 150 after receiving the signals, the user-focusing technique adds pseudo "distortion" before the signals are transmitted at the transmitter 110. These "pre-distorted" signals are then transmitted in such a way that the signal distortion can be successfully removed while propagating.

Figure 4:
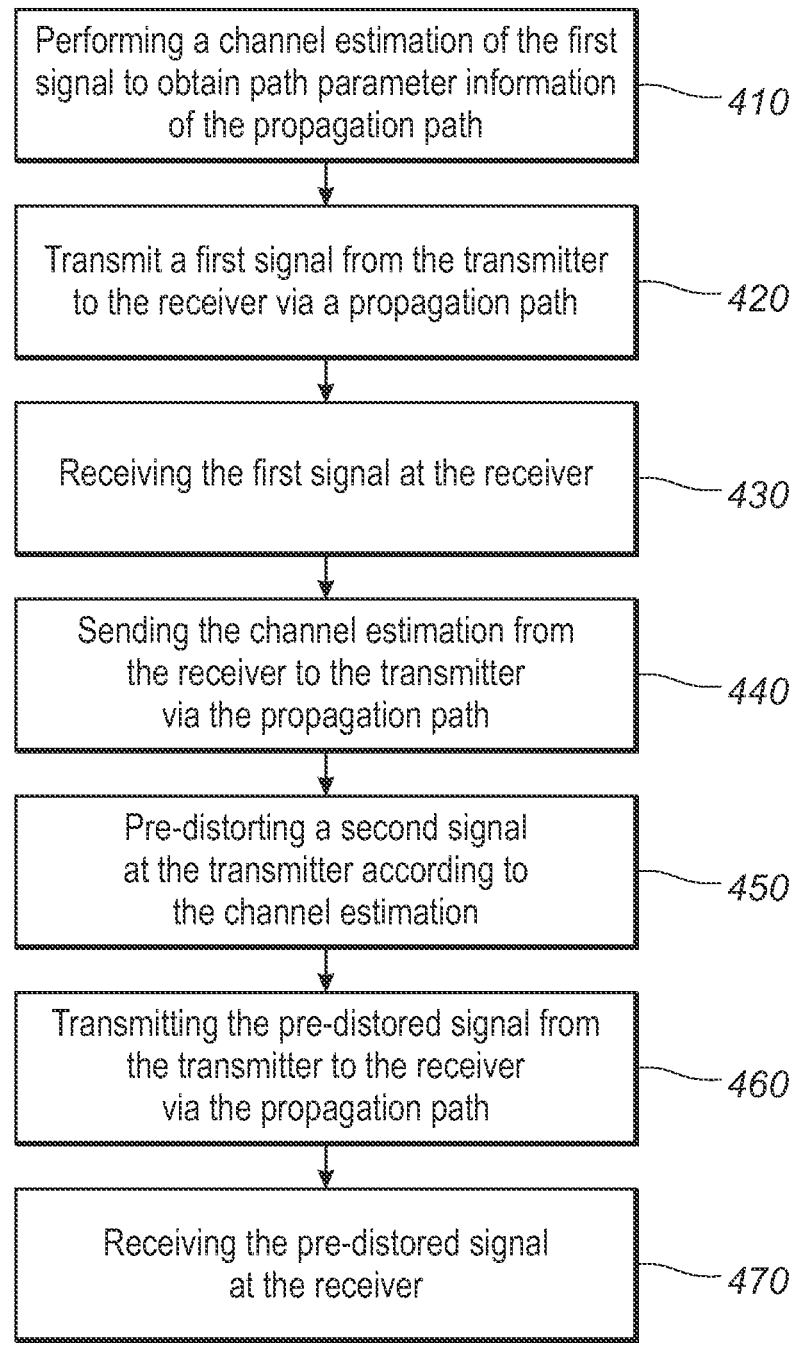
FIG. 4 includes a flow diagram illustrating an embodiment of a user-focusing technique in a wireless communication system.

More specifically, as shown in FIG. 4, the method begins at 410 where a channel estimation of a first signal is performed so as to obtain path parameter information of the propagation path 170, 175, or 180. During this process, a transmitter transmits 420 a first signal from the transmitter 110 to the receiver 150. In one embodiment the first signal comprises distorted preambles or training sequences transmitted from the transmitter 110. After the first signal is received 430 at the receiver 150, a channel estimation algorithm is performed to obtain the estimates of the delay $\tau$, the Doppler frequency u, direction of arrival $\Omega_1$, direction of departure $\Omega_2$, and complex amplitude $\alpha$ for each of the propagation paths 170, 175, and 180.

Various channel estimations may be used, including the SAGE algorithm. Other algorithms for estimating the parameters include Maximum likelihood estimation algorithms including the specular-path-based maximum likelihood method. One drawback of the maximum likelihood algorithm, however is that it results in high complexity in many instances. However, when the generic model is correctly chosen, the obtained parameter estimates have higher accuracy than those obtained by using other methods.

Other examples of channel estimations which may be used include Spectral-based methods, including the Bartlett beamformer, the Capon beamformer, and the MUSIC (MUltiple Signal Classification) method. These methods are used to compute the power spectrum of the channel in multiple dimensions, e.g. in the delay, Doppler frequency and directions. These methods can return estimates of the path parameters with low complexity. They are practical and much more appropriate for real implementation than the maximum-likelihood based estimation methods.

Still another channel estimation algorithm which may be used in association with the non-spectral-based method are Subspace-based techniques, such as the root-MUSIC technique, and the ESPRIT (Estimation of Signal Parameters based on Rotational-Invariance Technique) algorithm, as well as the extension of these algorithms, e.g. Propagator method and Unitary-ESPRIT technique. These algorithms have high accuracy, but because the input of these algorithms are the observations of channel from multiple independent snapshots in order to avoid the singularity issue of the covariance matrix of received signals, data must be collected from multiple frames in a relatively long time window.

Approximation of the maximum-likelihood method based on iterative schemes may also be used at step 410. These algorithms include the expectation-maximization (EM) method, the space-alternating generalized Expectation-maximization (SAGE) technique and the so-called RiMAX (Richter's maximum likelihood estimation) method.

Alternatively, methods based on LSE (least-square-error) principles, such as the LMMSEE (Least minimum mean squared estimation error) estimator, and the covariance matrix fitting technique may also be used.

Furthermore, new algorithms for estimating path parameters, which probably have not been disclosed, can also be used in our case. For example, the maximum-a-posterior based methods, the Bayesian techniques, might also be considered as important elements in the pre-distorting technique. Additionally, besides the estimation techniques, tracking algorithms may be used to get the estimates of path parameters, such as the Kalman filtering technique, the enhanced Kalman filtering technique, the particle filtering technique, the particle-filter based SAGE algorithm, etc.

Next, at 440 the receiver 150 feedbacks these path parameter information to the transmitter 110 via the propagation path 170, 175, or 180. This feedback operation can be performed according to the existing protocols in wireless communication systems.

Then, at 450 for the next frame or block to transmit, the transmitter "pre-distorts" a second signal and generates multiple signal replica with appropriate settings of the transmitting time, transmitting pace and directions, receiving directions and complex weight of the signal. These settings are determined by the parameters of paths fed-back from the receiver at 440. These distorted replica are summed up and transmitted 460 from the transmitter 110 to the receiver 150. The signal is then received 470 at the receiver 150.

In order to illustrate method and by way of example, the two propagation paths 170 and 180 of FIG. 1 may be compared. The two paths 170 and 180 each exhibit different delays (because of the different path lengths), different directions of departure and of arrival (due to the different locations of the scatterers 120 and 122) and distinctive Doppler frequency (due to the movement of the receiver 150 and the different constellation of the paths).

In this example, $(\Omega_{i,1}, \Omega_{i,2}, \upsilon_i, \tau_i)$ correspond to the direction of departure, direction of arrival, delay, and Doppler frequency of path 170 and 180, respectively, where path 170 corresponds to i=1 and path 180 corresponds to i=2. In the instance where there are M antennas in the antenna array 260 of the transmitter 110 and N antennas in the antenna array 230 of the receiver 150, a M×N replica of the transmitted signal is created at step 450 using the path parameter information sent to the transmitter 110 at 450 such that:

$$\alpha_i^* \exp(-j2\pi(f-\nu_i)\tau_i) c_{Tx}^*(\Omega_{1,i}) \otimes c_{Rx}^*(\Omega_{1,i}) u(f), \text{ for } i=1,2$$

Where $c_{Tx}^*(\Omega_1)$ denotes the complex conjugate of the transmitter antenna array 260 response at the direction $\Omega_1$, $c_{Rx}^*(\Omega_1)$ denotes the complex conjugate of the receiver antenna array 230 response at the direction $\Omega_2$, u(f) represents the transmitted signal represented in the frequency domain, * represents the complex conjugate, and $\otimes$ denotes Kronecker product. Notice that $c_{Tx}(\Omega_1)$ and $c_{Rx}^*$ are M×1 and N×1 column vectors, respectively. Then the combined signal x(f) is calculated by summing up the M×N signal replica. After that, the inverse Fourier transformation is applied to obtain the representation of x(t) in time domain, i.e.

$$x(t) = F^{-1}[x(f)],$$

where $F^{-1}$ denotes the inverse Fourier transformation.

As described more fully below, one benefit of the method and systems described herein is that a conventional equalization process in the conventional receiver is not needed anymore, because the pre-distortion can be removed automatically by the propagation channel, i.e. the channel itself works as an equalizer. The signals propagating along different paths are completely aligned with the same phase when they arrive at the receiver 150, and thus, can be added constructively. The received signal in baseband representation can be directly sent to the demodulation block for further processing.

One aspect of the method is that the training sequence is not "pre-distorted." This is because the receiver 150 requires that the training sequence be distorted by propagation in order to estimate the parameters of the propagation paths.

As may be understood by one of skill in the art, the use-focusing technique can be tailored to suffice different application purposes. Whether these parameters may be advantageous can depend on the objective of introducing the user-focusing technique. For example, the information of the delays of individual paths is required when the user-focusing is used to synchronize the transmission through different paths in frequency domains. Similarly the Doppler frequency is required when the synchronization is demanded in the time domain; the directions of departure are required when the signals are to be aligned in the input of multiple antennas in the transmitter side; the directions of arrival can be used when synchronization is performed at the output of the multiple antennas in the receiver side. Hence, depending on the requirements of the system, more or fewer parameters may be used in order to perform the pre-distorting described above, and the use of the parameters described herein may be modified without departing from the scope of the disclosure.

Furthermore, it is possible to make use of new parameters for achieving more levels of user-focusing. For example, the polarization status of the propagation path can be used to achieve polarization synchronization, which leads to a new application of the user-focusing technique, i.e. focusing on specific users in polarization domains.

Alternatively, the parameters regarding the system responses, rather than the propagation channels may be used. When multiple systems are used to make a focus on the same user, it may be beneficial to include the characteristics of these systems, in order to remove the impact of the systems. These parameters regarding the system response can be the excess processing delay time, phase noises, etc.

Figure 5A:
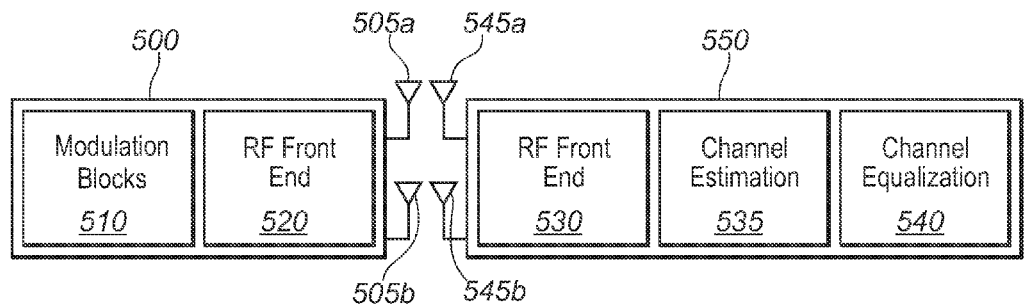
FIG. 5A includes a diagram representing a conventional wireless communication system.
Figure 5B:
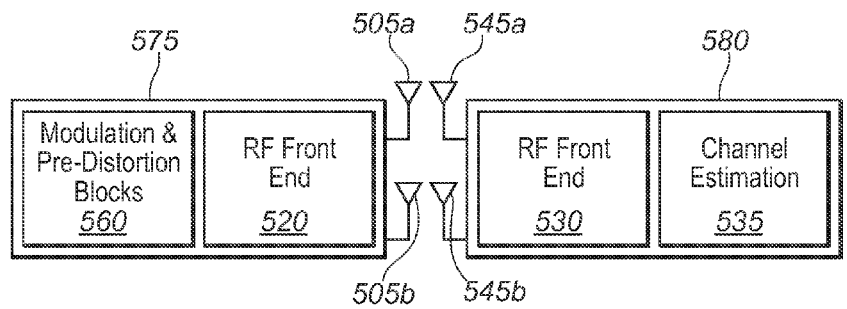
FIG. 5B includes a diagram representing a wireless communication system which is capable of performing a user-focusing technique as described herein.
Figure 5C:
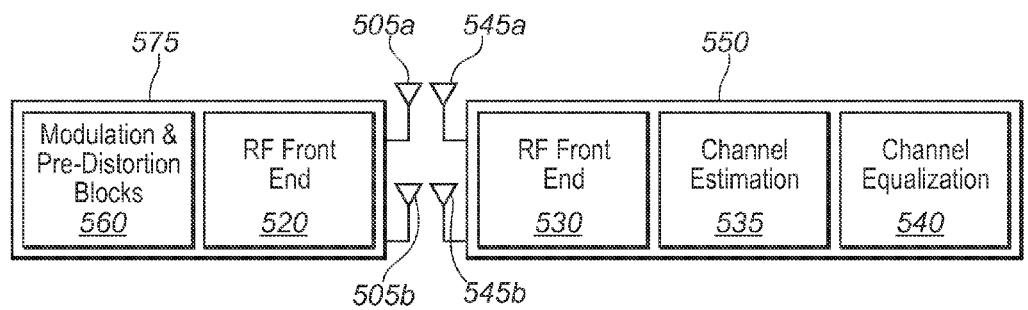
FIG. 5C includes a diagram representing a wireless communication system according to another embodiment of a system which is capable of performing a user-focusing technique as described herein, all arranged in accordance with at least one of the embodiments described herein, and which arrangement may be modified in accordance with the disclosure provided herein by one of ordinary skill in the art.
Figure 3:
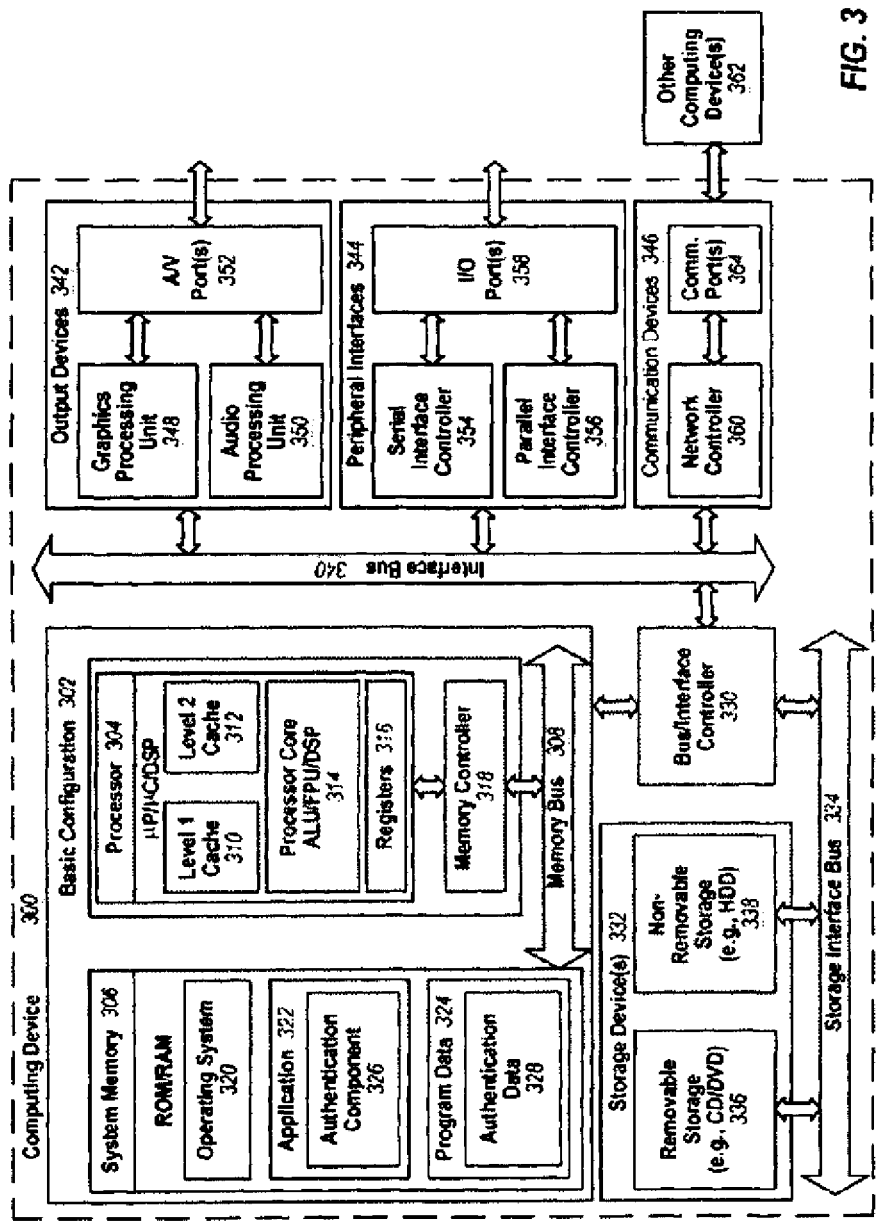

FIGS. 5A-5C illustrate comparisons of the embodiments described herein to a conventional communication chain.

FIG. 5A depicts the modification that can be implemented in the conventional communication system when the user-focusing technique is applied. In the conventional configuration, the transmitter 500 includes modulation blocks 510, a RF front end 520 and antennas 505a and 505b. The receiver 550 includes a RF front end 530 a channel estimation module 535, antennas 545a and 545b and a channel equalization module 540.

By way of comparison, FIG. 5B illustrates the transmitter 575 and receiver 580 according to the technology described herein. As described above, because the embodiments described herein utilize a pre-distortion technique performed in a modulation and pre-distortion block of the transmitter 575, there is no need for the channel equalization block 540, as required in receiver 550.

In another embodiment shown FIG. 5C, the receiver 550 may be used to perform channel equalization in addition to the transmitter performing pre-distortion using a modulation and pre-distortion block 560.

In the following, we compare the user-focusing technique described herein with the other conventional techniques currently known to one of ordinary skill in the art. As may be understood, the methods and systems described herein offer benefits not currently available using the configurations currently known to one of ordinary skill in the art.

A. Comparison to the Coherent-Combination in the Joint-Processing Technique Proposed for the CoMP System Specified in 3GPP.

For the future generation wireless communications, such as the LTE-Advanced systems, coordinated multiple-point (CoMP) transmission techniques will be used to improve the coverage of high-data rate in the cell edge. One of the technique used by CoMP is the "joint processing (JP)". In the 3GPP technical standard, the word "coherent adding" is used to indicate that the signals originated by different transmitters are combined constructively in the receiver. In our opinion, this "coherent adding" is an extension of the standard channel equalization techniques used in single link wireless communication to the multi-link scenario, i.e. the impact of the channels between the multiple transmitters and the receiver should be removed by equalization.

This channel equalization process is different from the principle of the user-focusing technique described herein, which pre-distorts the transmitted signals in such a way that the channel's effect is automatically equalized during the propagation. Furthermore, as described with FIG. 5C above, it is possible to utilize the user-focusing technique in the CoMP scenario, where every transmitter 575 uses the user-focusing technique to transmit pre-distorted signals while a separate channel equalization process is performed at the receiver 550.

As such, it is possible to use both equalization technique and pre-distortion technique at in the same system. As explained before, the equalization technique is used in the receiver 150, while the pre-distortion is applied in the transmitter 110. When the pre-distorted technique is used, the complexity of the equalization may be significantly reduced in the receiver 150.

For example, in an instance where the receiver 150 is moving at the speed of 350 km/h, the channel equalization block 540 of the receiver, such as the GSM terminals, is normally only able to support the communication when the moving speed is up to 200 km/h. So when the user terminal moves beyond 200 km/h, the communications become highly unstable. In order to maintain communication without significantly modifying the receiver 150, the user-focusing technique described herein may be implemented in the transmitter 110 by pre-distorting the signals in such a way that the signal received in the receiver 150 is similar with those observed when the user equipment moves at the speed below 200 km/h. So in this example, the equalization and pre-distortion techniques may be jointly used. Thus, the ability to distribute the complexity of coping channels in harsh conditions is increased.

In another example, the receiver 150 may be configured as a part of a standard mobile phone where equalization is used, but where the mobile terminal is equipped with a single antenna, rather than multiple antennas, preventing its ability to do spatial equalization. However, the channel around the mobile terminal is still directive, meaning that the impinging waves exhibit different directions of arrival or directions of departure.

The user-focusing technique may then be used to enforce the signals coming from different directions towards the receiver 150 to "focus" on the receiver 150. Assuming that the transmitter 110 has multiple antennas in its antenna array 260, and that the transmitter 110 knows the directions of departure of certain propagation paths 170, 175, and 180 between the transmitter 110 and the receiver 150, the pre-distortion is added in the transmitter 110 to remove the selectivity in the space in proximity of the transmitter 110. This operation, although not completely removing the spatial selectivity, can mitigate the impact of the multipath on the receiver 150.

In summary, depending on the capability of the transmitter 110 and the receiver 150 in the communication system, the pre-distortion and equalization can be implemented in different domains and be used at the same time.

B. Comparison to Precoding Techniques

The systems and methods described herein can make use of the concept of "pre-distortion," which has significant difference from the conventional precoding techniques. The latter can make use of simplified representations of channel, e.g. in terms of code-book, while the system and methods described above make use of the parameters of the propagation channel, e.g. the delay, Doppler frequencies, directions of departure and directions of arrival. This full-dimensional parametric description of the channel can be much more accurate than using the codebooks. Furthermore, only by using the precise channel parameters, synchronization of the signals to form a "focus" on specific user can be possible. The conventional precoding techniques cannot be used to create a concentration of the signal at a certain point (which can move) in space.

C. Comparison to the SDMA Technique

The smart antenna of the SDMA (spatial division multiplexing access) technique can make use of SDMA technique to direct the beam to the certain directions. However, in SDMA, there is no concept of pre-distortion of the signals in time, frequency and space domains, as described above. Furthermore, embodiments described herein require that the propagation paths be differentiable in the directions, and also in the delay, Doppler frequency. By conducting the pre-distortion in time, frequency and space jointly, the method described above is able to create a focus of the signal following a moving point in an environment with multi-path richness.

D. Comparison to the Multipath-Based Channel Simulation Technique

The geometrical stochastic channel models (GSCM) are widely used for simulating the propagation channel when performing conformity test for e.g. the IMT-Advanced systems. In these models, multiple paths characterized by delay, Doppler, directions and polarizations are added to reproduce the time-variant channels. While the user-focusing system and methods described herein utilize multiple propagation paths, the concept of per-path-modulation and the pre-distortion method are different from the method used the GSCM-based channel simulation.

E. Comparison to Pre-Equalization Techniques

The user-focusing system and methods described herein pre-distort transmitted signals in 3 dimensions, i.e. time, frequency and spatial domains. Furthermore, it can be beneficial to point out that the parameters considered for pre-distorting are delays, Doppler frequencies and directions of arrival and of departure of multiple propagation paths, rather than the "taps", allowing for counteracting the phase drifting in time, frequency and space samples.

Furthermore, the pre-equalization techniques usually rely on the structure of finite impulse response (FIR) filter, while the user-focusing systems and methods described herein use individual propagation path without requiring a finite impulse response. Additionally, while the pre-equalization technique aims at removing the inter-symbol-interferences (ISI) in the frequency and spatial domains, the user-focusing systems and methods remove the ISI in time, frequency and spatial domains. This enables the user-focusing technique to be performed in time-variant cases in environments with rapidly changing channels, while the pre-equalization technique is only applicable in the fixed wireless, wireless local loop systems.

The user-focusing technique can be used in conventional wireless communication systems, future generation of wireless communication systems, such as the Long-Term-evolution (LTE)-Advanced, the ad-hoc wireless network, e.g. the vehicular wireless networks, as well as in the contexts of non-communication applications, such as power transferring, no-harm operation, and sensor networks. So it is valuable to the equipment manufacturers, designers, research and developing companies in these areas.

In addition to the embodiments described above, the methods described herein can be applied to a variety of existing communications systems. By way of illustration, the following are examples of scenarios where the user-focusing technique described above may be used:

Example 1

Communications systems including single transmitter and single receiver MIMO scenarios. The user-focusing technique can be used in the system with one transmitter and one receiver. Compared with the systems without the user-focusing technique, the new system can support higher throughput, and may work more stably in the environments with poor channels.

Example 2

Communication systems including multiple transmitter and single receiver SISO (single-input single-output) scenarios. The user-focusing technique can be implemented in the transmitter side. When the transmitters are synchronized in time and frequencies, the transmitters can coordinate in such a way that the signals coming from difference transmitters will not exhibit transmitting selectivity. This can help build e.g. the Coordinated Multiple-Point (CoMP) systems.

Example 3

Communication systems including multiple transmitter and multiple receiver SISO scenarios. When multiple receivers are present in the network, the user-focusing technique can also be implemented when the channels among the transmitter and the receivers are known.

Example 4

Communication systems including multiple transmitter and multiple receiver MIMO scenarios. The user-focusing technique can utilize the directional channel properties when the MIMO configuration is considered.

Example 5

Broadcasting scenarios with known channels between the broadcasting station and the receiver.

Example 6

Broadcasting with multiple base stations in a single network.

Example 7

Remote sensing. The user-focusing technique allows the electromagnetic waves to focus on certain point, which might be stationary or moving, in the 3-D or even 4-D, when time is considered as an additional dimension. This feature makes the technique applicable to monitor the changes at specific locations in real environments.

Example 8

Remote charging. The user-focusing technique can concentrate the energy transmitted at specific receiving location. When there is certain equipment located at specific places, the transmitter can use multiple channels to transfer the energy to the equipment. The energy in the electromagnetic field focused on specific points can be transferred to other kinds of energy in desired forms, such as thermal and electric energy, thus making operations, e.g. remote charging, possible.

The above mentioned applications are all based on combining the user-focusing technique with existing systems. The advantages of the systems augmented with user-focusing functions are the increased energy-usage-efficiency, better and robust performance. Furthermore, for communications systems, if the user-focusing technique is used, the cost of constructing a system might be reduced since deploying base stations can be done in a more flexible way. This is owing to the inherent property of the user-focusing technique, i.e. the resources in the environment are fully exploited for achieving specific goals.

Hence, the user-focusing methods and systems described herein have various advantages including removal of the fast fading effect of the signals by compensating the delays, Doppler frequencies, direction of arrival and direction of departure of the propagation paths. This can significantly reduce the burden of developing advanced receivers in communication systems.

Additionally, the systems and methods described herein make use of the parameters of propagation instead of the simplified channel status information, and thus, the focus resulted can be highly concentrated. The interference cancellation is much more efficient by using the user-focusing than the conventional methods relying on e.g. the precoding techniques.

Furthermore, the user-focusing technique can be generalized and used for many purposes other than wireless communications, such as wireless power transferring to specific points, wireless charging of battery at remote positions, and accurate point-point wireless connection in the area where the users are very dense.

Also, the methods and systems described herein save power, as the transmission is conducted in a very efficient manner. No energy is wasted on non-existing propagation paths.

Finally, the systems and methods described herein are easily implemented because the modification is mainly including the pre-distortion function in the transmitter side. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware. The modules recited herein can include hardware and/or software.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims. All references recited herein are incorporated herein by specific reference in their entirety.

The invention claimed is:

1. A method for wireless communication in a system including a transmitter, a receiver, and a plurality of propagation paths formed between the transmitter and the receiver which are capable of carrying a signal transmitted by the transmitter to the receiver, the method comprising:
   transmitting a first signal from the transmitter to the receiver via a first propagation path of the plurality of propagation paths;
   receiving the first signal at the receiver;
   performing a channel estimation based on the first signal to obtain path parameter information of the first propagation path;
   sending the channel estimation that includes the path parameter information from the receiver to the transmitter via the first propagation path;
   predistorting a second signal at the transmitter in a time domain, a frequency domain, and a spatial domain, according to the channel estimation based on the first signal;
   transmitting the predistorted second signal from the transmitter to the receiver via the first propagation path; and
   receiving the predistorted second signal at the receiver.

2. The method of claim 1, wherein the path parameter information of the first propagation path includes at least one of an estimation of a delay, an estimation of a Doppler frequency, an estimation of a direction of arrival, an estimation of a direction of departure, and an estimation of a complex amplitude of the first propagation path.

3. The method of claim 2, wherein the path parameter information of the first propagation path further includes an estimation of a polarization status of the first propagation path.

4. The method of claim 1, wherein the path parameter information is obtained by at least one estimation technique of the group consisting of a maximum-likelihood estimation algorithm, periodogram, correlatorgram, spectral-based methods, Bartlett beamformers, Capon beamformers, subspace-based techniques, MUSIC (MUltiple SIgnal Classification), ESPRIT (Estimation of Signal Parameters via Rotational Invariance Techniques), approximation of the maximum-likelihood method based on iterative schemes, SAGE (Space-Alternating Generalized Expectation-maximization), RiMAX (Richter's Maximum Likelihood method), maximum-a-posteriori based methods, Evidence Framework, Bayesian techniques, tracking algorithms, Kalman filtering techniques, enhanced Kalman filtering techniques, particle filtering techniques, and least-square-error methods.

5. The method of claim 1, the method further comprising:
performing a system response estimation of the first signal to obtain parameter information of the system;
sending the system response estimation from the receiver to the transmitter via the first propagation path; and
further predistorting the predistorted second signal at the transmitter according to the system response estimation.

6. The method of claim 1, further comprising equalizing the predistorted second signal at the receiver.

7. The method of claim 6, wherein equalizing the predistorted second signal is performed using a joint processing technique in a coordinated multiple-point (CoMP) system.

8. A system for wireless communication comprising:
a receiver;
a transmitter; and
a plurality of propagation paths formed between the transmitter and the receiver which are capable of carrying a signal transmitted by the transmitter to the receiver,
wherein the receiver is configured to receive a first signal that is transmitted along a first propagation path of the plurality of propagation paths from the transmitter, perform a channel estimation based on the first signal to obtain path parameter information of the first propagation path, and send the channel estimation that includes the path parameter information to the transmitter via the first propagation path, and
wherein the transmitter is configured to predistort a second signal in a time domain, a frequency domain, and a spatial domain according to the channel estimation that is based on the first signal and received from the receiver and to transmit the predistorted second signal to the receiver via the first propagation path.

9. The system of claim 8, wherein the path parameter information of the first propagation path includes at least one of an estimation of a delay, an estimation of a Doppler frequency, an estimation of a direction of arrival, an estimation of a direction of departure, and an estimation of a complex amplitude of the first propagation path.

10. The system of claim 8, wherein the path parameter information of the first propagation path further includes an estimation of a polarization status of the first propagation path.

11. The system of claim 8, wherein the path parameter information is obtained by at least one estimation technique of the group consisting of a maximum likelihood estimation algorithm, periodogram, correlatorgram, spectral-based methods, Bartlett beamformers, Capon beamformers, subspace-based techniques, MUSIC (MUltiple SIgnal Classification), ESPRIT (Estimation of Signal Parameters via Rotational Invariance Techniques), approximation of the maximum-likelihood method based on iterative schemes, SAGE (Space-Alternating Generalized Expectation-maximization), RiMAX (Richter's Maximum Likelihood method), maximum-a-posteriori based methods, Evidence Framework, Bayesian techniques, tracking algorithms, Kalman filtering techniques, enhanced Kalman filtering techniques, particle filtering techniques, and least-square-error methods.

12. The system of claim 8, wherein the transmitter and the receiver each comprise multiple antennas in a multiple-input and multiple-output (MIMO) wireless communication system or a single antenna in a single-input and single-output (SISO) wireless communication system.

13. The system of claim 8, wherein the receiver is further configured to perform a system response estimation of the first signal to obtain parameter information of the system and to send the system response estimation from the receiver to the transmitter via the first propagation path,
wherein the transmitter is further configured to further predistort the predistorted second signal according to the system response estimation.

14. The system of claim 8, wherein the receiver is further configured to equalize the predistorted second signal.

15. A base station for performing wireless communication with a receiver in a wireless device via a plurality of propagation paths, the base station comprising:
a transmitter;
a computing device; and
a computer-readable storage medium having computer-executable instructions stored thereon that are executable by the computing device to perform operations comprising:
transmitting a first signal from the transmitter to the receiver via a first propagation path of the plurality of propagation paths;
receiving a channel estimation based on the first signal, the channel estimation including path parameter information of the first propagation path;
predistorting a second signal in a time domain, a frequency domain, and a spatial domain according to the channel estimation based on the first signal; and
transmitting the predistorted second signal from the transmitter to the receiver via the first propagation path.

16. The base station of claim 15, wherein the path parameter information of the first propagation path includes at least one of an estimation of a delay, an estimation of a Doppler frequency, an estimation of a direction of arrival, an estimation of a direction of departure, an estimation of a complex amplitude of the first propagation path, and an estimation of a polarization status of the first propagation path.

17. The base station of claim 15, wherein the transmitter comprises multiple antennas in a multiple-input and multiple-output (MIMO) wireless communication system or a single antenna in a single-input and single-output (SISO) wireless communication system.

18. The base station of claim 15, wherein the computing device performs further operations comprising:
receiving a system response estimation of the first signal that contains parameter information of the base station, the wireless device, and of the first propagation path; and
further predistorting the predistorted second signal according to the system response estimation.

19. A wireless device for performing wireless communication with a base station with a transmitter via a plurality of propagation paths, the wireless device comprising:
   a receiver;
   a computing device; and
   a computer-readable storage medium having computer-executable instructions stored thereon that are executable by the computing device to perform operations comprising:
      receiving a first signal at the receiver via a first propagation path of the plurality of propagation paths;
      performing a channel estimation based on the first signal to obtain path parameter information of the first propagation path;
      sending the channel estimation that includes the path parameter information to the transmitter; and
      receiving a second signal via the first propagation path, the second signal predistorted in a time domain, a frequency domain, and a spatial domain according to the channel estimation based on the first signal.

20. The wireless device of claim 19, wherein the path parameter information of the first propagation path includes at least one of an estimation of a delay, an estimation of a Doppler frequency, an estimation of a direction of arrival, an estimation of a direction of departure, and an estimation of a complex amplitude of the first propagation path.

21. The wireless device of claim 20, wherein the path parameter information of the first propagation path further includes an estimation of a polarization status of the first propagation path.

22. The wireless device of claim 19, wherein the path parameter information is obtained by at least one estimation technique of the group consisting of a maximum likelihood estimation algorithm, periodogram, correlatorgram, spectral-based methods, Bartlett beamformers, Capon beamformers, subspace-based techniques, MUSIC (MUltiple SIgnal Classification), ESPRIT (Estimation of Signal Parameters via Rotational Invariance Techniques), approximation of the maximum-likelihood method based on iterative schemes, SAGE (Space-Alternating Generalized Expectation-maximization), RiMAX (Richter's Maximum Likelihood method), maximum-a-posteriori based methods, Evidence Framework, Bayesian techniques, tracking algorithms, Kalman filtering techniques, enhanced Kalman filtering techniques, particle filtering techniques, and least-square-error methods.

23. The wireless device of claim 19, wherein the receiver comprises multiple antennas in a multiple-input and multiple-output (MIMO) wireless communication system or a single antenna in a single-input and single-output (SISO) wireless communication system.

24. The wireless device of claim 19, wherein the computing device performs further operations comprising:
   receiving a third signal along another of the plurality of propagation paths, the third signal being phase aligned with the second signal when received by the receiver such that no equalization of the second and third signals is performed by the wireless device.

25. The wireless device of claim 19, wherein the computing device performs further operations comprising:
   generating a system response estimation of the first signal that contains parameter information of the base station, the wireless device, and of the first propagation path; and
   receiving the second signal predistorted based on the system response estimation.

* * * * *

UNITED STATES PATENT AND TRADEMARK OFFICE
CERTIFICATE OF CORRECTION

PATENT NO. : 8,891,347 B2
APPLICATION NO. : 13/522422
DATED : November 18, 2014
INVENTOR(S) : Yin It is certified that error appears in the above-identified patent and that said Letters Patent is hereby corrected as shown below:

In The Drawings

In Fig. 3, Sheet 2 of 4, delete "UP/UC/DSP" and insert -- $\mu P/\mu C/DSP$ --, therefor. (See Attached Sheet)

In The Specification

In Column 1, below Title, insert -- RELATED APPLICATION DATA
The present application is a U.S. national stage filing under 35 U.S.C. §371 of International Application No. PCT/CN2011/077718, filed on July 28, 2011, the entire contents of which are incorporated herein by reference. --.

In Column 6, Line 39, delete "and or" and insert -- and/or --, therefor.

In Column 8, Line 29, delete "Signal" and insert -- SIgnal --, therefor.

In Column 9, Line 34, delete "i–1,2" and insert -- i–1,2, --, therefor.

In Column 9, Line 35, delete "Where" and insert -- where --, therefor.

In Column 9, Line 41, delete "$c_{Tx}(\Omega_1)$ and $c_{Rx}*$" and insert -- $\overset{*}{c}_{Tx}(\Omega_1)$ and $\overset{*}{c}_{Rx}(\Omega_1)$ --, therefor.

In The Claims

In Column 17, Line 27, in Claim 6, delete "comprisingequalizing" and insert -- comprising equalizing --, therefor.

Signed and Sealed this
Ninth Day of June, 2015

Michelle K. Lee
*Director of the United States Patent and Trademark Office*